Sept. 11, 1934.  V. E. DUEMLER ET AL  1,972,875
CONTROL SYSTEM FOR POWER OIL BURNERS
Filed Jan. 19, 1925  3 Sheets-Sheet 1

Inventors.
Virgil E. Duemler,
George R. Koeln,
Their Attorneys.

Sept. 11, 1934.   V. E. DUEMLER ET AL   1,972,875
CONTROL SYSTEM FOR POWER OIL BURNERS
Filed Jan. 19, 1925    3 Sheets-Sheet 2

Inventors.
Virgil E. Duemler,
George R. Koeln,
by
Their Attorneys

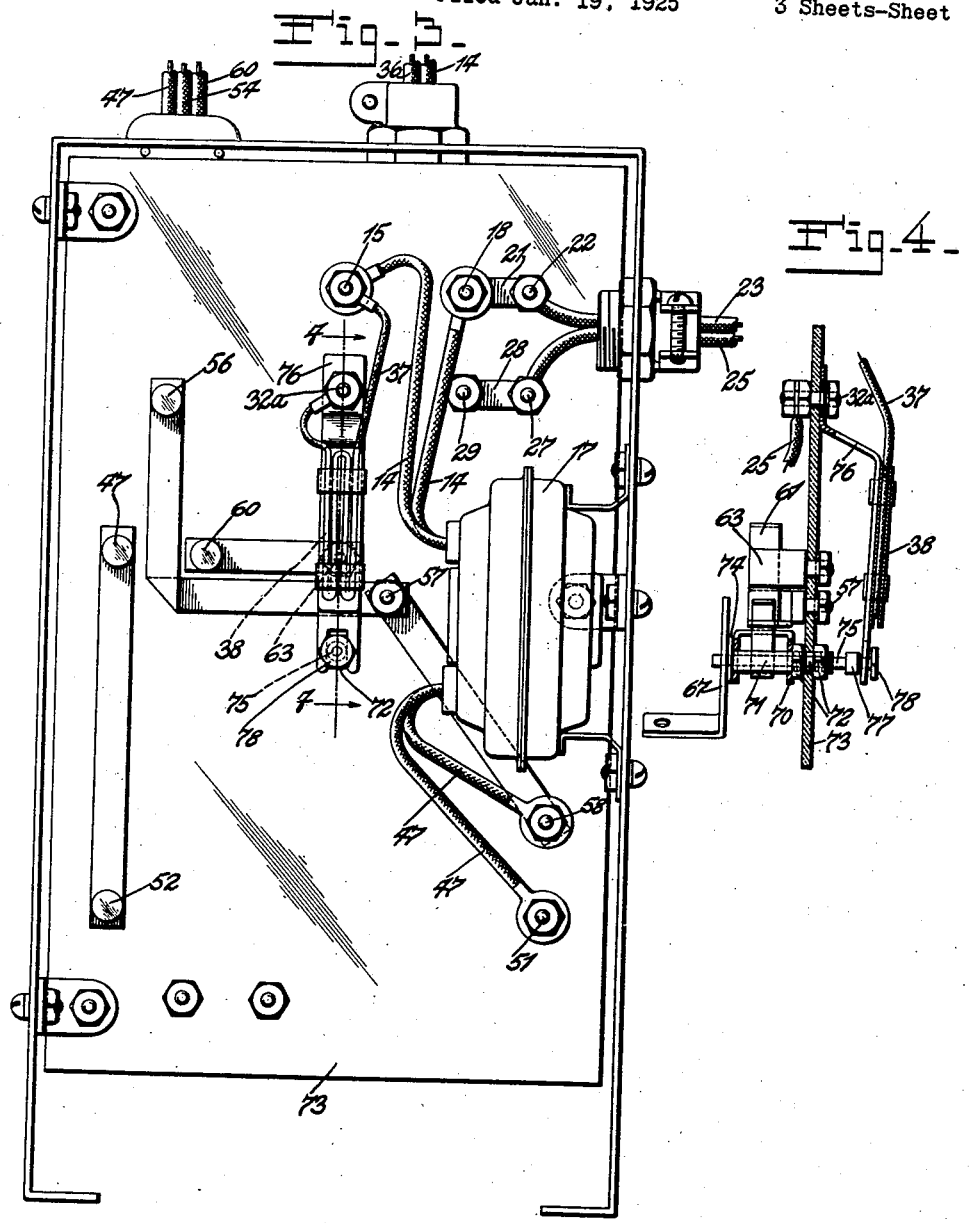

Patented Sept. 11, 1934

1,972,875

UNITED STATES PATENT OFFICE 1,972,875

CONTROL SYSTEM FOR POWER OIL BURNERS

Virgil E. Duemler, Maplewood, and George R. Koeln, St. Louis, Mo., assignors, by mesne assignments, to The Cleveland Trust Company, a corporation of Ohio Application January 19, 1925, Serial No. 3,407

14 Claims. (Cl. 158—28)

This invention relates to a control system for power oil burners.

The general system of control of oil burners comprises a motor circuit that is closed for the purpose of operating the oil pump to deliver a spray of oil to the combustion chamber where it is ignited for the development of heat. The circuit is normally closed ordinarily through a manually operated switch and there is interposed in the circuit a secondary switch under control of a thermostatic device, so that when a temperature of a predetermined maximum is developed at a remote point in respect of the heating element, the circuit controlling the motor is opened to terminate the supply of fuel to the combustion chamber. This is broadly the normal operation of the control for the oil burner and acts satisfactorily under a normal operation of the entire system. If, however, any element of the system ceases to function, unless there is some further provision for cutting off the motor and ignition circuits under such abnormal condition, the feed of fuel to the combustion chamber may continue after the ignition of the fuel at the delivery point ceases, or the supply of fuel may fail and the ignition means may continue to operate.

The object of the present invention is to provide a control under the direct influence of heat from the combustion chamber, whereby the motor circuit will be opened upon a failure to develop heat in the heating element, or if a drop in temperature within a narrow limit from the normal maintenance temperature for holding the circuit closed occurs after the development of heat has been initiated. There is also provided means that requires manual resetting of the control before the motor circuit may be closed, after any operation of opening the circuit as a result of the failure of the burner.

With these general objects in view, the device of the present invention consists of a suitable switch arranged normally to function as the secondary switch for the power circuit, and to function normally with the thermostatic control, said secondary switch being also under control of a thermostatic device operating under the direct influence of heat in the combustion chamber, whereby said secondary switch will be opened in such manner that it will require manual resetting upon failure to develop heat or an abnormal drop of temperature within the heating element within a narrow predetermined range.

The objects of the invention are attained by the construction illustrated in the drawings, in which Fig. 1 is a complete diagrammatic view of the entire system incorporating the controls therefor.

Fig. 3 is a reverse view of said panel further illustrating the controls for said secondary switch with the electrical connections thereto.

Fig. 4 is a cross section substantially on the line 4—4 of Fig. 3.

Figure 1:
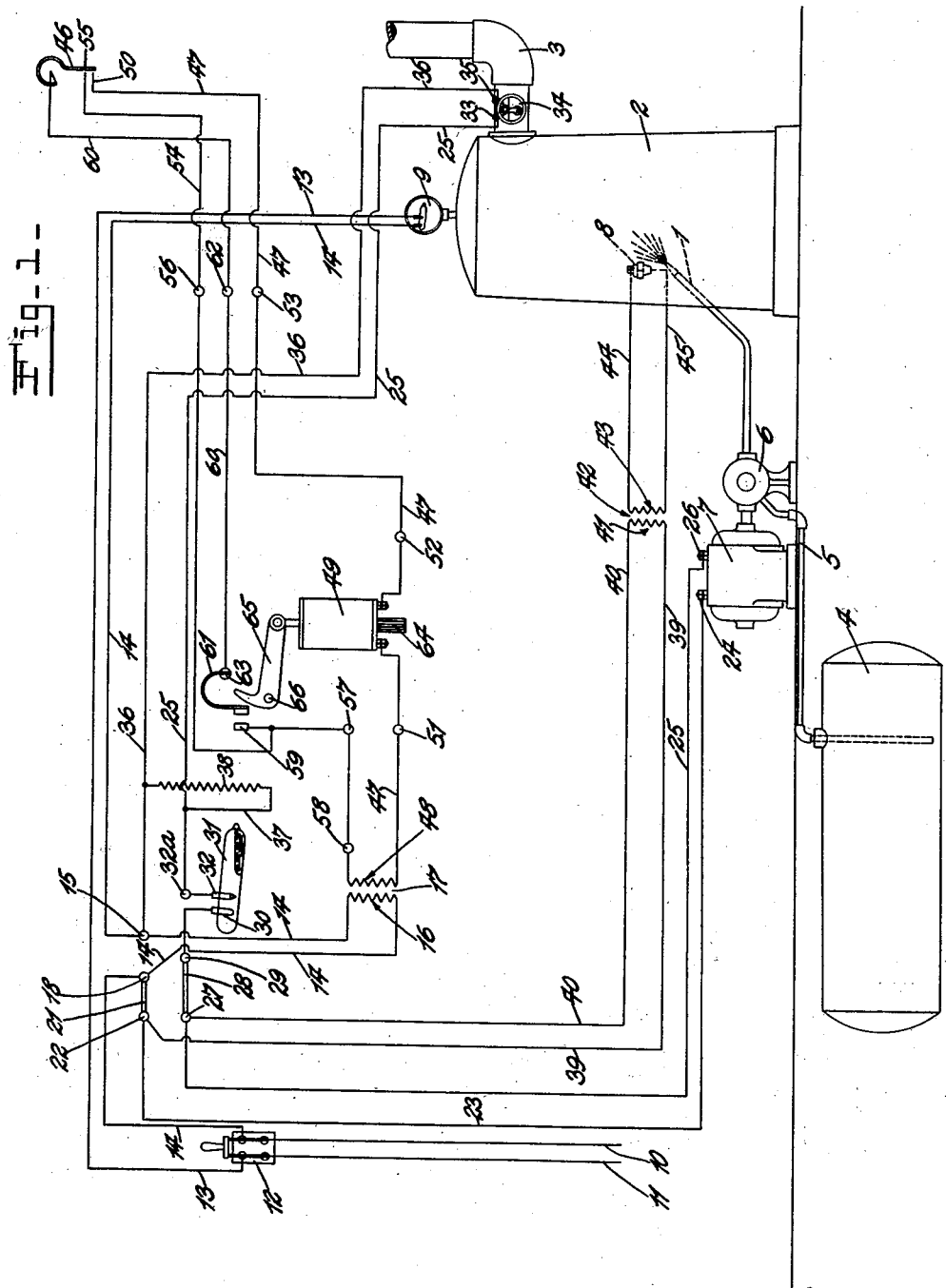

The oil burner mechanism and the system of control include generally an oil delivery nozzle 1 through which the oil is supplied with a proper mixture of air for combustion to the combustion chamber of the heating element 2. The heating element is provided with a flue 3. The oil is supplied from a source of supply, for instance a tank 4, through an oil line 5 and delivered to the nozzle through a pump 6 operated by a motor 7. The oil at the delivery point is ignited by any suitable means, in the embodiment shown by an electrical ignition device 8. The heating element is preferably equipped with a safety switch 9 that under normal conditions remains closed and which is designed to operate either upon the increase of pressure or of heat, depending upon the character of the heating element employed.

The electrical energy for operating the various controls and circuits is preferably obtained from the ordinary house wiring, or any other suitable source of electrical energy, the two leads of the main circuit being indicated in the drawings by 10 and 11. The leads 10 and 11 terminate at a manually operated switch 12, whereby the main circuit may be cut out when desired. The circuit passing through the switch 9 comprises a lead 13 and a lead 14, the lead 13 running direct from the switch point 12 to the automatic switch 9; and the lead 14 running from the switch 9 to a binding post 15, thence through the primary 16 of a transformer 17 to a binding post 18, and thence to the switch 12. The circuit thus described may, for the purpose of convenience, be referred to as circuit A and remains the live or energized circuit throughout the normal operation of the device and until some abnormal condition in the heating element opens the circuit at the switch 9.

The next circuit, which for the purpose of convenience may be referred to as circuit B, is the circuit for the motor and comprises a buss bar 21 connecting a binding post 22 with the binding post 18. A lead 23 from the binding post 22 connects with a binding post 24 of the motor circuit. The other lead 25 of the motor circuit extends from the other binding post 26 of the motor to a binding post 27 across a buss bar 28 to a binding post 29 and thence to one terminal 30 of a mercury switch 31. The other terminal 32 of the mercury switch is attached to a binding post 32ᵃ and is connected with one terminal 33 of a thermostatic circuit closer 34 arranged within the direct influence of heat generated within the heating element, the details of operation of which will be more fully described hereinafter. When the circuit is closed across the device 34 current flows from the opposite terminal 35 of the device 34, which terminal is connected by a lead 36 with the binding post 15, that is in circuit with the main energizing circuit A.

There is a circuit 37 having a resistance element 38 between the leads 36 and 25, the resistance by its heat operating in connection with a device hereinafter to be described for opening the mercury switch 31 in such a way as to require manual resetting as a result of the opening of the thermostatic circuit closer 34 under abnormal conditions of operation in the heating element.

A third circuit, referred to as circuit C, is in parallel with the motor circuit just described and includes leads 39 and 40, the lead 39 being connected with the binding post 22 and the lead 40 being connected with the binding post 27 and being responsive therefore to the opening or closing of the circuit B. The leads 39 and 40 connect with the primary 41 of a transformer 42, the secondary 43 of said transformer having leads 44 and 45, respectively, connecting with the ignition device 8.

The next circuit, for convenience referred to as circuit D, is a three-wire circuit under the influence of a thermostat 46 and includes a lead 47 from the secondary 48 of the transformer 17 through the winding of the solenoid 49, thence to a terminal point 50 of the thermostat. For convenience in mounting the lead 47 includes binding posts 51, 52 and 53.

A lead 54 terminates adjacent to a terminal point 55 on the thermostat 46 and extends to the secondary winding of the transformer 17, the said lead having therein binding posts 56, 57 and 58 for convenience in mounting. The said lead 54 has in circuit therewith a switch terminal 59. The action of the thermostat 46 is such that upon a drop in the room temperature the circuit between the leads 47 and 54 will be closed before a circuit is established across the leads 47 and a lead 60. The thermal element 46 is connected with the lead 60, and at its opposite end with a spring switch plate 61, the said lead 60 having binding posts 62 and 63 therein for convenience in mounting.

The action of the thermostat control by the device 46 is as follows: Upon a drop in temperature, the device 46 first contacts the point 50 and then the point 55. The initial contact with the point 50 is ineffective to complete the circuit because it is open at the switch terminal 59. Upon contact with the point 55, however, an effective circuit is completed and the solenoid 49 is energized. When the solenoid 49 is energized the armature 64 is raised, rocking the arm 65 pivoted at 66, closing the circuit between the spring contact plate 61 and switch terminal 59, and thereby establishing a second circuit path along the lead 60 parallel with the lead 54. It will thus be seen that so long as the spring plate 61 contacts the switch terminal 59 either lead will complete the circuit and maintain the armature 64 in raised position. Upon a rise in temperature the thermostatic element 46 is so deflected as to first open the circuit through the lead 54 at the point 55. But the lead 60 is sufficient to complete the circuit so long as the spring plate 61 contacts the switch terminal 59, and the solenoid 49, therefore, continues to be energized. A further temperature rise breaks the contact at 50, opening the circuit through the solenoid 49 and allowing the armature 64 thereof to drop by gravity, thereby breaking the circuit between the switch terminal 59 and the spring switch plate 61, and requiring a re-establishment of the circuits as previously described.

The arm 65 is operatively connected with the control device hereinafter described, so that when the solenoid is energized the mercury switch 31 will be operated to closed position completing the operative circuits B and C for supplying energy to the motor and to the ignition device. The circuits and controls thus far described disclose the complete operative arrangement of the device and will make clear the operation of the device and its controls to which this disclosure is particularly directed.

Figure 2:
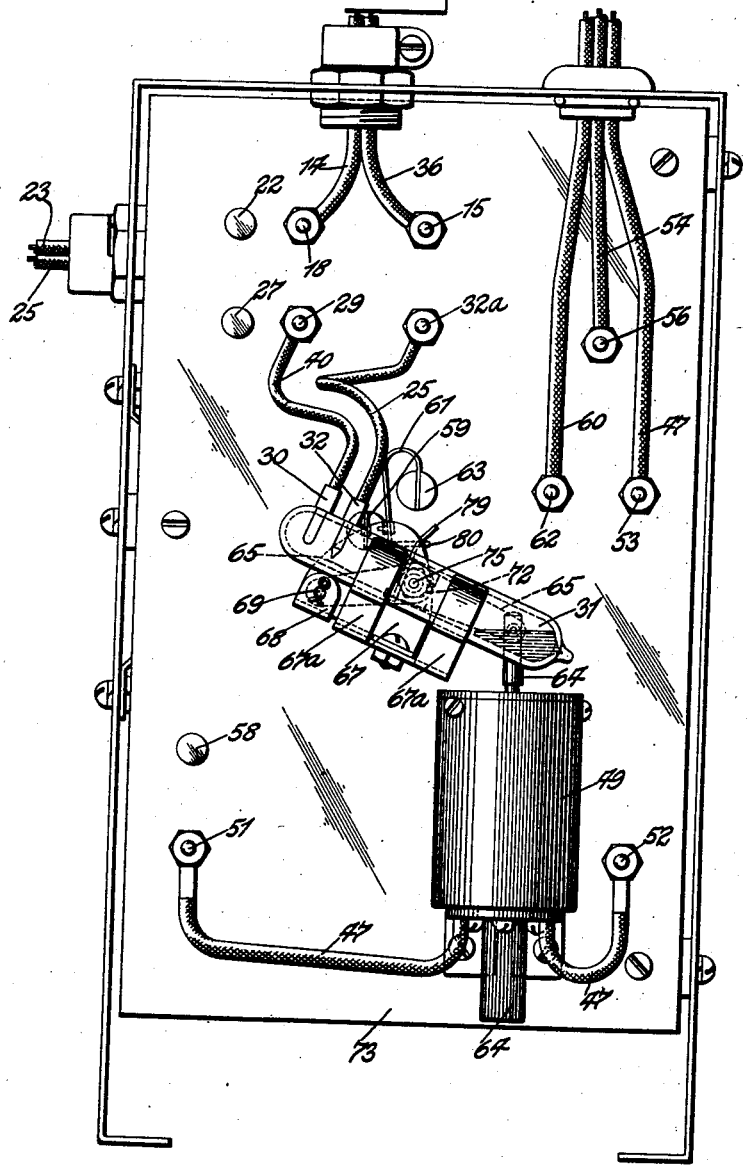
Fig. 2 is a front view of the panel and of the secondary switch with its controls.

The structure illustrated in Figs. 2, 3 and 4 of the drawings embodies the switch for the circuits B and C controlling the motor and ignition devices and includes the mercury switch 31 mounted in a bracket 67. The bracket 67 has a U-shaped bearing 68 at its end and a spring clip support 67ᵃ for the tube 31 and is arranged so that when in the position shown in Fig. 2 the circuit between the terminals 30 and 32 is open, thereby opening the circuits B and C. The bracket supporting the mercury tube pivotally connects with the forward end of the arm 65 by means of a pivot pin 69 that passes through the arm and also through the arms of the U-shaped bearing 68.

The arm 65 has a rearwardly extending integrally formed U-shaped support 70 having openings therein that fit over a bushing 71, the bushing 71 being supported by jam nuts 72 through the wall 73 of the supporting panel. The support 70 is held on the bushing 71 by a flange 74, and a pin 75 extends through the bushing the forward end projecting inwardly through an opening in the bracket 67. The pin 75 is axially movable so that it may be retracted from the opening in the bracket 67 permitting the bracket to be released from the end of the pin 75 that constitutes its normal pivot. The pin 75 is operated by a thermostatic strip 76 supported on the back wall of the bearing 68 by the binding post 32ᵃ, said strip 76 being free at its lower end and provided with a notch that fits over the pin 75 between the heads 77 and 78 on the pin. The U-shaped support 70 has an upwardly extending strip 79 that moves with it and between the arms of a bail 80, one of the arms of the bail being attached to the lower end of the spring contact member 61.

When the parts are in the position shown in Fig. 2 of the drawings, that is with the armature 64 in the down position and the pin 75 projecting through an opening in the bracket, the bracket supporting the tube of the mercury switch 31 is in operative relationship with the arm 65. In this position the mercury in the tube is at the lower end of the tube and out of contact with the terminal elements 30 and 32, opening the operative circuits of the device. In this position it will be noted also that the strip 79 bearing against the outer wall of the bail 80 retracts the spring contact member 61 so to open the circuit between the member 61 and the contact point 59.

Assuming that the apparatus is in normal position of operation the circuits through the switches 9 and 34 are closed. Upon a drop of the room temperature within which the thermostatic device 46 is located the circuit across the contact point 50 and 55 will first be closed, thereby energizing the solenoid through the circuit previously described in reference to the diagram, raising the armature 64 and rocking the arm 65 and the bracket supporting the mercury tube 31, and at the same time moving the switch 59—61 to closed position. When the circuit between the terminal elements 30 and 32 of the mercury switch is closed the motor circuit B and the ignition circuit C are energized placing the burner in operation to raise the temperature within the heating element, the operation continuing until the thermostat 46 operates to again open the circuit.

The resistance element 38 in the circuit between the leads 25 and 36 is associated with the thermostatic strip 76 so that when an undue heating of the strip 76 occurs as a result of a continued passage of current through the resistance 38, the pin 75 will be retracted and the mercury switch 31 will be lowered to break the circuit across the terminals 30 and 32. This retraction of the pin disconnects the bearing 68 from the arm 65, so that regardless of the movement of the arm the mercury switch will be rendered inoperative until reset. The lower end of the strip 76 is bent inwardly and serves as a spring normally actuating the pin 75 inwardly, but when the end of the strip is moved outwardly, due to heating of the resistance element, the pin will be withdrawn requiring manual resetting before the switch 31 may be operated to close the operating circuits B and C.

The resistance circuit 38 has a double function and is calibrated with the switch device 34 so that when the current is initially turned on it will serve primarily to complete the circuit between the leads 25 and 36 when the thermostatic switch 34 is open. As the construction of the thermostatic switch 34 is the subject matter of Patent No. 1,706,057, granted March 19, 1929 upon our copending application it is unnecessary to describe that switch in detail, except to say that when there is no heat within the heating element the switch 34 remains open, and upon a predetermined increase of heat in the heating element the switch 34 closes and remains closed during a progressive rise in temperature, opening upon a limited drop in temperature from the maximum attained.

Obviously, therefore, when initiating the operation of the burner the switch device 34 will be open and the current between the leads 25 and 36 will pass through the lead 37 and resistance 38. The thermostatic strip 76 is so calibrated that it will not operate to release the pin 75 from the bearing 68 under normal conditions before the circuit is completed through a shunt path provided by the switch 34. Once the circuit has been completed through the switch 34 the current will cease to pass through the resistance circuit 38 and no further outward deflection of the strip 76 will occur. If there is a defect in function of the burner, such, for instance, as failure to deliver fuel to the combustion point, or a defect in the ignition device, no heat will be generated within the heating element and the switch 34 will remain open. A continued passage of the current through the resistance element 38 will operate to heat the strip 76 to a degree sufficient to retract the pin 75, causing the bearing 68 supporting the mercury switch 31 to be released from the arm 65, the bearing pivoting on the pin 69 and causing the tube 31 to drop by gravity to the position shown in the diagram, where the mercury is at the lower end of the tube, thereby opening the circuit between the terminal points 30 and 32 and opening the operative circuits B and C. This would occur either by failure to initiate the operation of the burner, or upon any interruption in the generation of heat by the burner after it had been initiated, which interruption would cause a drop of a predetermined degree from a maximum temperature attained.

We are aware that numerous variations may be made in the construction and mode of operation without departing from the spirit and scope of the invention. We are not limiting ourselves therefore to unessential details, but what we claim and desire to secure by Letters Patent is:—

1. The combination with an electrical machine, of a power circuit for said machine, a switch controlling said power circuit, an electrical device for operating said switch, an operative connection between said device and said switch, a resistance circuit in series with the power circuit, and a thermostatic device associated with said resistance circuit for disabling the connection between said switch and said device.

2. The combination with an electrical machine, of a power circuit for said machine, a switch controlling said power circuit, an electrical device for operating said switch, a connection between said switch and said device, a resistance circuit in series with said power circuit, a thermostatic device in association with said resistance circuit for mechanically disabling the connection between said switch and said device, and a separate thermostatically operated switch for closing a shunt circuit around said resistance circuit.

3. The combination with an electrical machine, of a power circuit for said machine, a mercury switch for controlling said power circuit, a solenoid, connections between the solenoid and said switch, a resistance circuit in series with the power circuit, and a thermostatic device operated by said resistance circuit for mechanically disconnecting the connection between said mercury switch and said solenoid.

4. The combination with an electrical machine, of a power circuit therefor, a mercury switch for controlling said power circuit, a solenoid, connections between the solenoid and said switch, a resistance circuit in series with the power circuit, a thermostatic device operated by said resistance circuit for mechanically disabling the connection between said mercury switch and said solenoid, and a separate thermostat controlling a shunt circuit around said resistance circuit.

5. The combination with a heating element, of a burner, a motor for operating the burner, a power circuit for said motor, a switch for controlling said power circuit, a device for operating said switch, a mechanical connection between said switch and said device, a resistance circuit in series with the power circuit, and a thermostatic device under direct influence of the temperature from the resistance circuit for disabling the connection between said switch and said device.

6. The combination with a heating element, of a burner, a motor for operating said burner, a power circuit for said motor, a switch for controlling said power circuit, a device for operating said switch, a resistance circuit connected in series with the power circuit, a mechanical connection between said switch and said device, a thermostatic device under the influence of heat from the resistance circuit for mechanically disabling the connection between said switch and said device, and a thermostatic switch within the direct influence of heat from said heating element arranged to open and close a shunt circuit around said resistance circuit.

7. The combination with a heating element, of a burner, a motor for operating said burner, a circuit for said motor, a switch for controlling said motor circuit, a device for operating said switch, a circuit connected with said last named device, a thermostatic switch remote from the heating element for controlling said last named circuit, a resistance circuit connected with said motor circuit, and a thermostatic device in association with said resistance circuit for disabling the connection between said switch and said device.

8. The combination with a heating element, of a burner, a motor for operating said burner, a power circuit for said motor, an ignition device for said burner, a power circuit for said ignition device, a switch for controlling the power circuits for the motor and ignition device, a device for operating said switch, a connection between said switch and said operating device, a resistance circuit connected with the motor power circuit, and a thermostatic device operated by the resistance circuit for mechanically disabling the connection between said switch and said operating device.

9. The combination with a heating element, of a burner, a motor for operating said burner, a power circuit for the motor, an ignition device for said burner, a power circuit for said ignition device, a switch for controlling the motor circuit and the ignition circuit, a device for operating said switch, a connection between the switch and said operating device, a resistance circuit connected with the motor power circuit, a thermostatic device under the control of the heat from the resistance circuit for mechanically disabling the connection between said switch and said operating device, and a thermostatic device within the direction influence of the heating element for establishing a shunt circuit around the resistance circuit when a predetermined temperature has been obtained in the heating element.

10. The combination with a heating element, of a burner, a motor for operating said burner, a circuit for said motor, an ignition device for said burner, a circuit for said ignition device, a switch for controlling the motor circuit and the ignition circuit, a device for operating said switch, a circuit connected with said last named device, a thermostatic switch remote from the heating element for controlling said last named circuit, a resistance circuit connected into the motor circuit, and a mechanical device operated by said resistance circuit for disabling the connection between said switch and said device.

11. The combination with a heating element, of a burner, a motor for operating said burner, a circuit for said motor, an ignition device for said burner, a circuit for said ignition device, a switch for controlling the motor circuit and the ignition circuit, a device for operating said switch, a circuit connected with said last named device, a thermostatic switch remote from the heating element for controlling said last named circuit, a resistance circuit in circuit with the motor and ignition circuits, a thermostatic device operated by said resistance circuit for disabling the connection between said switch and said device, and a thermostatic device within the direct influence of said heating element for controlling the resistance circuit.

12. The combination with a heating element, of a burner, a motor for operating said burner, an ignition device for said burner, a power circuit for said motor and said ignition device, a resistance circuit connected with the power circuit, a switch for controlling said power circuit, a thermostatic switch under the influence of heat from the burner operable to close the power circuit after the burner has heated the device to a predetermined temperature, and means for opening the power switch operable upon a predetermined temperature developed in said resistance circuit.

13. The combination with a heating element, of a burner, a motor for operating said burner, a power circuit for said motor, a switch for controlling the said power circuit, a device for operating said switch, a circuit connected with said last named device, a thermostatic switch remote from the heating element for controlling said last named circuit, a resistance circuit across said power circuit, a thermostatic switch remote from the heating element for controlling said resistance circuit, a thermostatic device in association with said resistance circuit for disabling the connection between said switch and said device, and a thermostatic device within the direct influence of said heating element for establishing a shunt circuit around the resistance circuit.

14. The combination with an electric ignition oil burner and power circuits therefor, of a room thermostat for controlling said power circuits, a resistance circuit connected with said power circuits, a switch for controlling the power circuits, an electrical device for operating said switch, a connection between said switch and said operating device having a coupling member that is disconnected by said resistance circuit when a predetermined heat is generated in the resistance circuit, and a device under the direct influence of heat from the burner operable to shunt the circuit from the resistance circuit when a predetermined degree of heat is obtained from the burner.

VIRGIL E. DUEMLER.
GEORGE R. KOELN.